(12) United States Patent
Wilson et al.

(10) Patent No.: US 9,771,166 B2
(45) Date of Patent: Sep. 26, 2017

(54) SYSTEM, KIT AND METHOD FOR INDICATING THE PRESSURE IN AN AIRCRAFT LANDING GEAR SHOCK ABSORBER

(71) Applicant: AIRBUS OPERATIONS LIMITED, Bristol (GB)

(72) Inventors: Fraser Wilson, Wotton-Under-Edge (GB); Stephen Briancourt, Bristol (GB); Scott Wallis, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 10 days.

(21) Appl. No.: 14/404,243

(22) PCT Filed: May 23, 2013

(86) PCT No.: PCT/GB2013/051363
§ 371 (c)(1),
(2) Date: Nov. 26, 2014

(87) PCT Pub. No.: WO2013/178999
PCT Pub. Date: Dec. 5, 2013

(65) Prior Publication Data
US 2015/0166195 A1    Jun. 18, 2015

(30) Foreign Application Priority Data

May 29, 2012    (GB) .................................. 1209502.2

(51) Int. Cl.
*B64D 45/00*    (2006.01)
*B64C 25/58*    (2006.01)
(Continued)

(52) U.S. Cl.
CPC .............. *B64D 45/00* (2013.01); *B64C 25/02* (2013.01); *B64C 25/58* (2013.01); *B64F 5/60* (2017.01);
(Continued)

(58) Field of Classification Search
CPC ......... B64D 45/00; B64C 25/02; B64C 25/58; G01B 11/14; G01L 7/16; G01L 9/0089; G01L 1/24; F16F 9/3292
See application file for complete search history.

(56) References Cited

U.S. PATENT DOCUMENTS 6,128,951 A    10/2000    Nance
7,274,310 B1 *  9/2007    Nance .................... G08B 21/00
                                                244/100 R
(Continued)

FOREIGN PATENT DOCUMENTS

WO    2005/022098 A1    3/2005
WO    2005/022100 A1    3/2005
(Continued)

OTHER PUBLICATIONS

International Search Report mailed Sep. 12, 2013 in International Application No. PCT/GB2013/051363, filed May 23, 2013.
(Continued)

*Primary Examiner* — Tien Dinh
*Assistant Examiner* — Vicente Rodriguez
(74) *Attorney, Agent, or Firm* — Hauptman Ham LLP

(57) ABSTRACT

A system for indicating the pressure in an aircraft landing gear shock absorber is provided, the system comprising a source of collimated light and a target, the source of collimated light being attached to the aircraft, and being operable to emit light onto the target; the position of the point of incidence of the light emitted from the source of collimated light on the target being indicative of the pressure in the
(Continued)

aircraft landing gear shock absorber. A kit for making such a system and a method of indicating the pressure in an aircraft landing gear are also provided.

10 Claims, 3 Drawing Sheets

(51) Int. Cl.
| | |
|---|---|
| *F16F 9/32* | (2006.01) |
| *G01L 7/16* | (2006.01) |
| *G01L 9/00* | (2006.01) |
| *G01M 17/04* | (2006.01) |
| *G01B 11/14* | (2006.01) |
| *B64C 25/02* | (2006.01) |
| *G01L 19/08* | (2006.01) |
| *B64F 5/60* | (2017.01) |

(52) U.S. Cl.
CPC ............ *F16F 9/3292* (2013.01); *G01B 11/14* (2013.01); *G01L 7/16* (2013.01); *G01L 9/0089* (2013.01); *G01L 19/08* (2013.01); *G01M 17/04* (2013.01)

(56) References Cited

U.S. PATENT DOCUMENTS

| | | | |
|---|---|---|---|
| 8,042,765 B1 | 10/2011 | Nance | |
| 8,643,831 B1* | 2/2014 | Gregory | .................. G01S 17/46 356/139.07 |
| 2007/0006662 A1* | 1/2007 | Giazotto | .................. B60T 8/00 73/800 |
| 2007/0235585 A1* | 10/2007 | Nance | .................... G08B 21/00 244/100 R |
| 2008/0119967 A1 | 5/2008 | Long et al. | |
| 2009/0007626 A1 | 1/2009 | Bochen et al. | |
| 2010/0064766 A1 | 3/2010 | Nugent et al. | |

FOREIGN PATENT DOCUMENTS

| | | |
|---|---|---|
| WO | 2005/022101 A1 | 3/2005 |
| WO | 2006/024146 A1 | 3/2006 |

OTHER PUBLICATIONS

Written Opinion mailed Sep. 12, 2013 in International Application No. PCT/GB2013/051363, filed May 23, 2013.
Search Report dated Aug. 9, 2012 in GB Application No. 1209502.2.

* cited by examiner

SYSTEM, KIT AND METHOD FOR INDICATING THE PRESSURE IN AN AIRCRAFT LANDING GEAR SHOCK ABSORBER

RELATED APPLICATIONS

The present application is a National Phase of International Application Number PCT/GB2013/051363, filed May 23, 2013, and claims priority from Great Britain Application Number 1209502.2, filed May 29, 2012.

BACKGROUND OF THE INVENTION

The present invention relates to a system for indicating the pressure in an aircraft landing gear shock absorber, a kit for the same and a method of determining the pressure in an aircraft landing gear shock absorber, such as shock absorbers in a nose wheel oleo or in the main landing gear. The system, method and kits are particularly effective for larger aircraft.

It is desirable for the pressure in aircraft landing gear shock absorbers to be within certain limits. If the pressure within a landing gear shock absorber is too low, the shock absorber may "bottom out" during landing, for example, possibly causing damage to the landing gear. If the pressure within a landing gear shock absorber is too high, the ability of the shock absorber to dampen peak loading may be reduced. Furthermore, the shock absorber may rupture under the application of a large load (as may be applied if the aircraft is heavily laden and/or on a hard landing). Many landing gear shock absorbers are not fitted with pressure sensors. If pressure sensors are fitted to a landing gear shock absorber, then the pressure sensors are sometimes located in positions which may be difficult to access, for example, close to the fuselage or at the very bottom of the landing gear. As a secondary check to determine pressure, the ground crew typically measure the distance between two parts of the shock absorber. This distance, coupled with knowledge of the aircraft's weight and the ambient temperature, may be used to provide an estimate of the pressure in the shock absorber. This measurement is sometimes known by those skilled in the art as "the H measurement" because it involves measuring the height of one part of the shock absorber in relation to another part. This measurement is prone to significant error, not least because it is difficult to measure the distance between the two parts of the shock absorber with any accuracy. Furthermore, information relating the distance measured to the pressure in the shock absorber is contained on placards which are attached to the landing gear. These placards are often difficult to read, which may make it difficult to determine the pressure from the distance measurement taken. U.S. Pat. No. 6,128,951 discloses the measurement of pressure in landing gear shock absorbers using pressure sensors. U.S. Pat. No. 6,128,951 also discloses the use of a radial variable digital transducer to measure landing gear shock absorber compression and extension.

It is an aim of the present invention to ameliorate one or more of the problems mentioned above.

SUMMARY OF THE INVENTION

There is provided in accordance with the present invention, a system for indicating the pressure in an aircraft landing gear shock absorber, the system comprising:

A source of collimated light and a target,
the source of collimated light being attached to the aircraft, and being operable to emit light onto the target;
the position of the point of incidence of the light emitted from the source of collimated light on the target being indicative of the pressure in the aircraft landing gear shock absorber.

The system of the present invention is typically suitable for indicating the pressure in an aircraft landing gear shock absorber when the aircraft is at rest. One or both of the target and the source of collimated light is optionally attached to, or part of, the aircraft, and may optionally be attached to, or part of, the landing gear. For example, the target may be provided by a placard which may be adhered or otherwise attached to the landing gear. Alternatively and additionally, the target (or part thereof) may be marked (e.g. painted), for example, marked (e.g. painted) onto part of the aircraft. Both the target and the source of collimated light may optionally be attached to the landing gear. Conveniently, the source of collimated light is optionally attached to the landing gear.

The shock absorber optionally comprises a piston disposed within a cylinder. The landing gear may optionally comprise a torque link. A torque link typically inhibits relatively rotational movement of two parts of the landing gear. For example, if the shock absorber comprises a piston disposed within a cylinder, a torque link may optionally be arranged to inhibit relative rotation of the piston and cylinder. This may be achieved, for example, by providing a first torque link portion attached to the cylinder and a second torque link portion attached to the first torque link portion. The second torque link portion is also typically attached to a wheel carrier which is attached to the piston. The orientation of the source of collimated light may be fixable relative to one of the first and second torque link portions. At least part of the target may optionally be provided on (or attached to) the cylinder and/or piston.

The source of collimated light may be movable between, and fixable in, a plurality of positions and/or orientations. Such an arrangement is beneficial to take into account variations in aircraft weight and ambient temperature. For example, increased aircraft weight will, for a given pressure in the shock absorber, give a bigger compression in the shock absorber, which may need to be accounted for by changing the position and/or orientation of the source of light. Likewise, a higher ambient temperature will lead to an increased pressure in the shock absorber, which will lead to a lower compression, which, once again, may need to be accounted for by changing the position and/or orientation of the source of light. The source of collimated light may be mounted for rotational movement between a plurality of different rotational positions. This may optionally be achieved, for example, by providing a movable (and optionally rotatable) rotatable light source carrier, the source of collimated light being attached to the carrier. Such a carrier may be attached to a torque link (for example, located between first and second torque link portions), optionally via one or more intermediate components or parts. The light source carrier may be provided as part of a mount for mounting the light source to the aircraft.

Those skilled in the art will realise that the system of the first aspect of the present invention does not necessarily provide an accurate measurement of the pressure in a shock absorber, but rather an indication of the pressure in the shock absorber which can be readily compared to a more accurate measurement provided by pressure sensors associated with the shock absorber.

In accordance with a second aspect of the present invention, there is provided a kit for producing a system for indicating the pressure in an aircraft shock absorber, the kit comprising:
(i) A source of collimated light;
(ii) A mount for mounting said light source on an aircraft; and
(iii) A target attachable to an aircraft to indicate the point of incidence of the collimated light produced by the source of collimated light.

The kit of the second aspect of the present invention may be used to make the system of the first aspect of the present invention. The features of the kit of the second aspect of the present invention may comprise the features described above in relation to the system of the first aspect of the present invention. For example, the source of collimated light may comprise a laser. Alternatively, the source of collimated light may comprise a light source which produces uncollimated light and one or more components for collimating the uncollimated light (such as one or more lenses or mirrors).

The target is attachable to an aircraft so that the point of incidence of the collimated light is indicative of the pressure in the landing gear shock absorber.

For example, the mount may comprise a movable light source carrier which is movable between, and fixable in, a plurality of positions and/or orientations. The mount may be adapted for attachment to the landing gear, for example, for attachment to a torque link.

In accordance with a third aspect of the present invention, there is provided a method for indicating the pressure in an aircraft landing gear shock absorber comprising:
(i) Providing an aircraft having a landing gear, the landing gear comprising a shock absorber;
(ii) Providing the aircraft with a source of collimated light and a target; and
(iii) Illuminating said target with light from the source of collimated light, the point at which the collimated light is incident on the target being indicative of the pressure in the shock absorber.

The method of the present invention typically indicates the pressure in an aircraft landing gear shock absorber when the aircraft is at rest.

Prior to step (iii), adjusting the orientation and/or position of the source of collimated light, dependent on one or more determined factors. The one or more determined factors may include the weight of the aircraft and the ambient temperature. Adjusting the orientation and/or position of the source of collimated light may comprise rotating the source of collimated light.

One or both of the target and the source of collimated light may optionally be attached to, or part of, the aircraft, and may optionally be attached to, or part of, the landing gear. For example, the target may be provided by a placard which may be adhered or otherwise attached to the landing gear. Alternatively and additionally, the target (or part thereof) may be painted, for example, painted onto part of the aircraft. Both the target and the source of collimated light may optionally be attached to the landing gear. Conveniently, the source of collimated light is optionally attached to the landing gear.

The shock absorber optionally comprises a piston disposed within a cylinder. The landing gear may optionally comprise a torque link. A torque link typically inhibits relative rotational movement of two parts of the landing gear. For example, if the shock absorber comprises a piston disposed within a cylinder, a torque link may optionally be arranged to inhibit relative rotation of the piston and cylinder. This may be achieved, for example, by providing a first torque link portion attached to the cylinder and a second torque link portion attached to the first torque link portion. The second torque link portion is also typically attached to a wheel carrier which is attached to the piston. The orientation of the source of collimated light may be fixable relative to one of the first and second torque links. At least part of the target may optionally be provided on (or attached to) the cylinder and/or piston.

The source of collimated light may be movable between, and fixable in, a plurality of positions and/or orientations. Such an arrangement is beneficial to take into account variations in aircraft weight and ambient temperature. For example, increased aircraft weight will, for a given pressure in the shock absorber, give a bigger compression in the shock absorber, which may need to be accounted for by changing the position and/or orientation of the source of light. Likewise, a higher ambient temperature will lead to an increased pressure in the shock absorber, which will lead to a lower compression, which, once again, may need to be accounted for by changing the position and/or orientation of the source of light. The source of collimated light may be mounted for rotational movement between a plurality of different rotational positions. This may optionally be achieved, for example, by providing a movable (and optionally rotatable) rotatable light source carrier, the source of collimated light being attached to the carrier. Such a carrier may be attached to a torque link (for example, located between first and second torque link portions), optionally via one or more intermediate components or parts. The light source carrier may be provided as part of a mount for mounting the light source to the aircraft.

The method of the third aspect of the present invention may use the system of the first aspect of the present invention and/or the kit of the second aspect of the present invention. Therefore, the method of the third aspect of the present invention may comprise those features described above in relation to the system of the first aspect of the present invention and/or the kit of the second aspect of the present invention.

DESCRIPTION OF THE DRAWINGS

The invention will now be described by way of example only with reference to the following figures of which.

DETAILED DESCRIPTION

Figure 1:
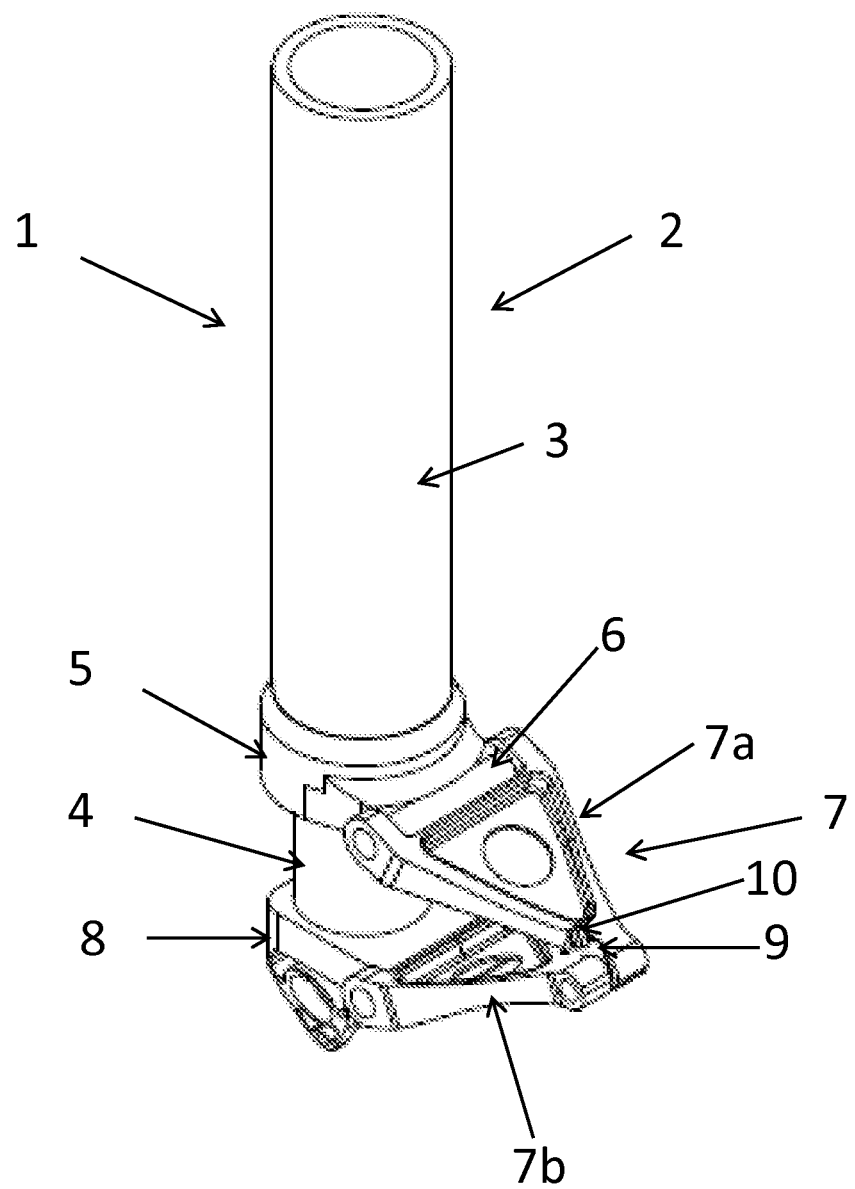
FIG. 1 is a perspective view of part of an example of a system and aircraft in accordance with the present invention.
Figure 2:
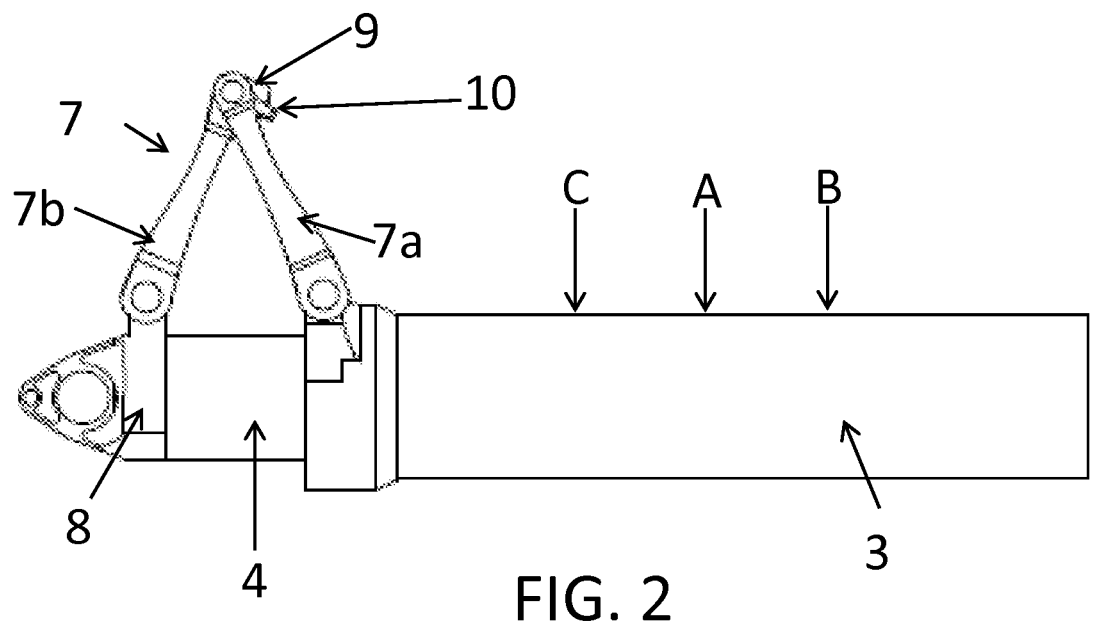
FIG. 2 is a side-on view of part of an example of a system and aircraft in accordance with the present invention.

FIG. 1 shows an aircraft and system in accordance with the present invention. The aircraft is denoted generally by reference numeral 1, and comprises a shock absorber 2, otherwise known to those skilled in the art as an oleo strut. The shock absorber 2 is part of a landing gear of an aircraft. Other parts of the landing gear (such as the wheels, the axles for mounting the wheels, the upper part of the landing gear for receiving the oleo strut) have been omitted from the figures for the purpose of clarity. The shock absorber 2 comprises a piston 4 received within a cylinder 3, as is conventional with such shock absorbers. The cylinder 3 is provided with a collar 5 which comprises a collar mount 6 onto which is pivotally attached a torque link 7. The torque link 7 is attached at its lower end to an axle mount 8 for receiving a wheel-bearing axle (not shown). The axle mount 8 is attached to the piston 4. The torque link 7 inhibits rotation of the piston 4 relative to the cylinder 3, as is well known to those skilled in the art. The torque link 7 comprises an upper torque link portion 7a and a lower torque link portion 7b which are pivotally connected to one another as is evident from FIGS. 1 and 2. The operation of the aircraft and system will now be briefly described. A laser 10 is mounted using a laser mount 9 between the upper and lower torque links 7a, 7b, and pointed towards the surface of the cylinder 3. When the laser 10 is activated, light from the laser is incident on the surface of the cylinder 3. This may be used to determine the pressure in the shock absorber as will now be described. In a first case [case A], the pressure in the shock absorber 2 is correct. When the pressure in the shock absorber 2 is correct, the amount the piston 4 projects from the cylinder and the angle formed by the upper and lower torque links 7a, 7b have certain values within predetermined limits (for a given weight of aircraft). In this case, the light emitted from laser 10 is incident on point A on the cylinder 3. When the pressure in the shock absorber 2 is higher than desired, the piston 4 projects further from the cylinder and the angle formed by the upper and lower torque links 7a, 7b is larger than desired, in which case light emitted from the laser 10 is incident on the surface of the cylinder 3 at point C. Likewise, when the pressure in the shock absorber 2 is lower than desired, the piston 4 projects less from the cylinder and the angle formed by the upper and lower torque links 7a, 7b is less than desired, in which case light emitted from the laser 10 is incident on the surface of the cylinder 3 at point B. The position at which the laser light is observed is therefore indicative of the pressure in the shock absorber 2. The shock absorber may be provided with a scale (not shown) which would give an indication of the pressure in the shock absorber 2. The scale may typically indicate whether or not the deviation in pressure from the desired value is tolerable.

Figure 3:
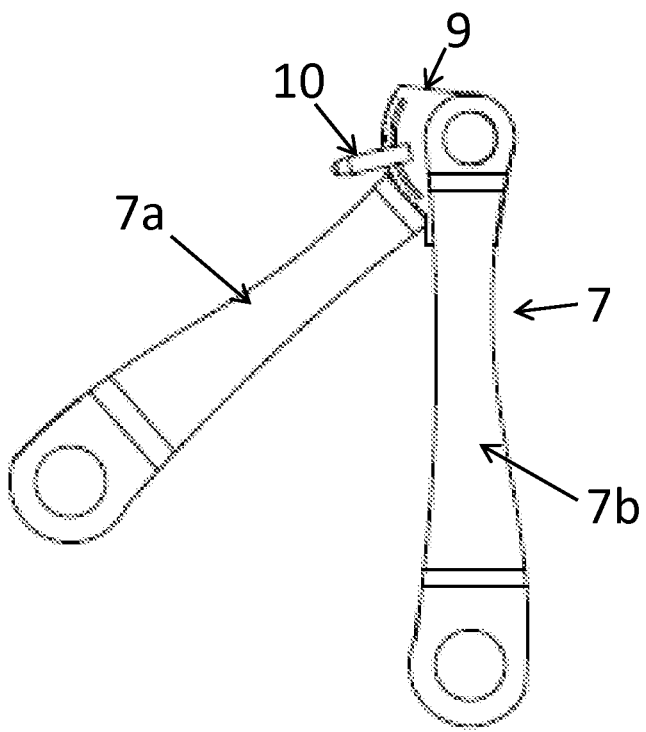
FIG. 3 is a side-on view of part of the system and aircraft of FIGS. 1 and 2 showing the arrangement of the torque link, laser and laser mount.
Figure 4:
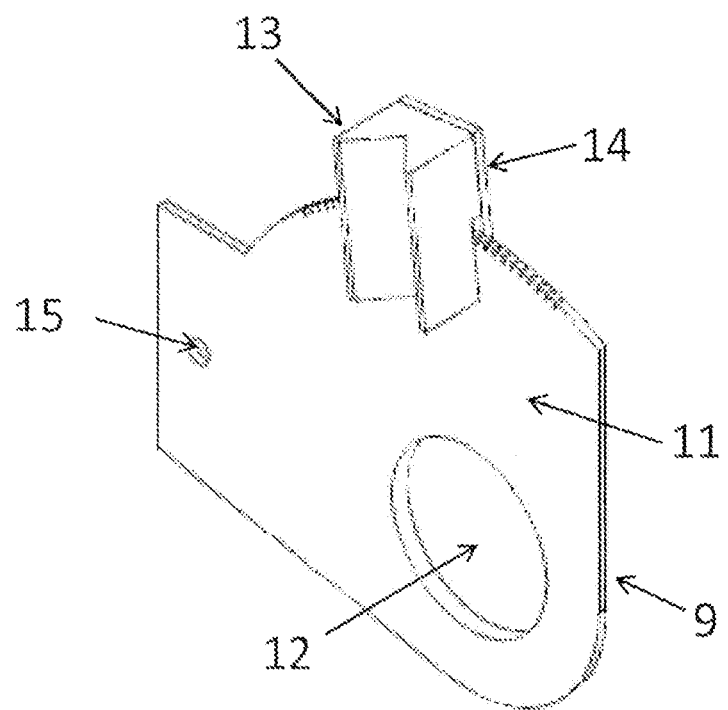
FIG. 4 is a perspective view (generally from a front side) of the laser mount used in the system and aircraft of FIGS. 1 to 3.
Figure 5:
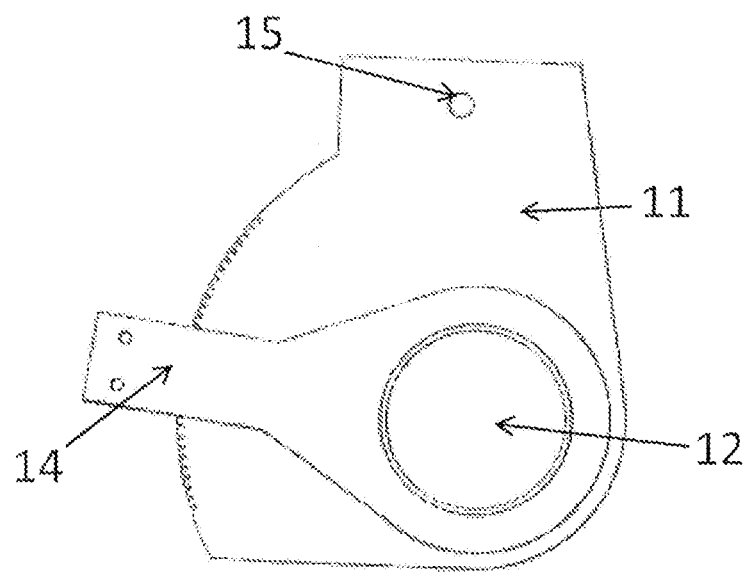
FIG. 5 is a side-on view (from the back side) of the laser mount of FIG. 4.

The mounting of the laser 10 will now be described with reference to FIGS. 3, 4 and 5. The laser 10 is mounted using a laser mount 9. The laser mount 9 comprises a plate 11 which is mounted between the upper and lower torque links 7a, 7b. The plate 11 is provided with an aperture 12 for receipt of a pivotal connection with connects the plate 11 to the upper and lower torque links 7a, 7b. The plate 11 is provided with a keyhole 15 which mates with a projection (not shown) on lower torque link 7b so that the orientation of the laser mount 9 relative to the lower torque link 7b is fixed. The orientation of the lower torque link 7b relative to the cylinder 3 changes as the extension of the piston 4 changes dependent on the pressure in the shock absorber 2. The laser mount 9 is provided with a laser cradle 13 which receives the laser 10. The laser cradle 13 is mounted on an arm 14, which is rotatable about aperture 12. The arm 14 is rotatable so that the angle of the laser may be varied dependent on the weight of the aircraft and/or the ambient temperature. For example, for a given pressure in the shock absorber 2, a heavier aircraft will compress the shock absorber more than a lighter aircraft, in which case the amount of piston 4 extending from the cylinder 3 will be lower and the angle of between the upper and lower torque links will be higher, causing the laser light to hit the surface of the cylinder further up the cylinder (i.e. further from the piston 4). Likewise, if the ambient temperature is high, this will lead to an increased pressure in the shock absorber, and an allowable should be made for the high ambient temperature. If a scale is provided on the cylinder, it may be desirable for the light to hit the scale in order that sensible readings may be taken. The rotatable nature of the arm 14 allows the laser to be aligned so that for any reasonable weight of aircraft the laser light hits the cylinder in the desired place for a desired shock absorber pressure. Therefore, for a large aircraft weight, the arm 14 may be rotated into a position closer to keyhole 15, and for a small aircraft weight the arm may be rotated into a position remote from keyhole 15.

The pressures estimated or indicated using the examples of the system and method of the present invention described above may be compared to measurements obtained from accurate pressure sensors associated with the shock absorber. If the disparity between the accurately measured pressure and the pressure estimated or indicated using the method and system mentioned above, then this is indicative of the need for some form of attention for the aircraft.

The example described uses a laser as a collimated light source. Those skilled in the art will realise that other collimated light sources may be used, for example, an uncollimated light source used in conjunction with one or more collimators (such as one or more collimating apertures or lenses).

The example described above describes a system in which the collimated light source is attached to the torque link of an aircraft shock absorber. Those skilled in the art will realise that, whilst this is a convenient arrangement, it is not necessary to attach the collimated light source to the torque link. For example, the collimated light source may be mounted onto the outer cylinder of a shock absorber, and angled so that the light emitted is incident on the piston, the position of the light on the piston being indicative of the pressure in the shock absorber. Alternatively, the collimated light source may be mounted onto the piston of a shock absorber, and angled so that the light emitted is incident on the piston and/or outer cylinder, the position of the light so emitted being indicative of the pressure in the shock absorber.

Where, in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A system for indicating a pressure in an aircraft landing gear shock absorber provided in a landing gear, the landing gear shock absorber comprising a shock absorber piston and a shock absorber cylinder, the landing gear comprising a torque link provided to inhibit relative rotation of the shock absorber piston and cylinder, the torque link comprising an upper torque link portion pivotally connected to a lower torque link portion, the system comprising:

a source of collimated light and a target, the target being positioned separate from the source of collimated light and being provided on, or attached to, the aircraft, the source of collimated light being attached to the torque link, the rotational orientation of the source of collimated light source being fixed relative to the orientation of one of the upper and lower torque link portions in one of a plurality of possible rotational orientations, and the source of collimated light being operable to emit light onto the target;

a position of a point of incidence of the light emitted from the source of collimated light on the target being indicative of the pressure in the aircraft landing gear shock absorber.

2. A system according to claim 1, comprising a movable light source carrier, the source of collimated light being attached to the light source carrier.

3. A system according to claim 1, comprising a movable light source carrier attached to the torque link, the source of collimated light being attached to the light source carrier.

4. A method for indicating the pressure in an aircraft landing gear shock absorber comprising:
  (i) providing an aircraft having a landing gear, the landing gear comprising a shock absorber comprising a shock absorber piston and a shock absorber cylinder, and a torque link for inhibiting relative rotation of the shock absorber piston and shock absorber cylinder, the torque link comprising an upper torque link portion pivotally connected to a lower torque link portion;
  (ii) providing the aircraft with a source of collimated light and a target, the source of collimated light being attached to the torque link and the target being positioned separate from the source of collimated light and being provided on, or attached to, the aircraft;
  (iii) adjusting the rotational orientation of the source of collimated light relative to the orientation of one of the upper and lower torque link portions dependent on the weight of the aircraft and/or the ambient temperature by rotating the source of collimated light, and then fixing the rotational orientation of the source of collimated light relative to the orientation of said one of the upper and lower torque link portions; and
  (iv) illuminating said target with light from the source of collimated light, a point at which the collimated light being incident on the target being indicative of the pressure in the shock absorber.

5. A method according to claim 4 wherein adjusting the orientation and/or position of the source of collimated light comprises rotating the source of collimated light.

6. A system for indicating a pressure in an aircraft landing gear shock absorber provided in an aircraft landing gear, the shock absorber comprising a shock absorber piston and a shock absorber cylinder, the aircraft landing gear comprising a torque link to inhibit relative rotation of the shock absorber piston and the shock absorber cylinder, the torque link comprising an upper torque link portion pivotally connected to a lower torque link portion, the system comprising:
  a source of collimated light and a target,
  the source of collimated light being attached to the upper torque link portion or the lower torque link portion, a rotational orientation of the source of collimated light is attached to one of the upper and lower torque link portions and the rotational orientation of the source of collimated light is fixed relative to the orientation of said upper or lower torque link portions in one of a plurality of possible rotational orientations, the source of collimated light being operable to emit light onto the target which is provided on, or attached to, the surface of the shock absorber cylinder or shock absorber piston;
  a position of a point of incidence of the light emitted from the source of collimated light on the target being indicative of the pressure in the aircraft landing gear shock absorber.

7. A system according to claim 1, further comprising a mount for mounting the light source on the aircraft, and facilitating rotation of the light source relative to the aircraft.

8. A system according to claim 4, wherein the target is provided on, or attached to, the shock absorber.

9. A system according to claim 1, wherein the source of collimated light is mounted for rotation between, and fixation in, a plurality of rotational positions relative to said one of the upper and lower torque link portions.

10. A system according to claim 6, wherein the source of collimated light is mounted for rotation between, and fixation in, a plurality of rotational positions relative to said one of the upper and lower torque link portions.

\* \* \* \* \*